United States Patent [19]

Absil et al.

[11] Patent Number: 5,348,643
[45] Date of Patent: Sep. 20, 1994

[54] CATALYTIC CONVERSION WITH IMPROVED CATALYST

[75] Inventors: Robert P. L. Absil, Mantua; Joseph A. Herbst, Turnersville, both of N.J.

[73] Assignee: Mobil Oil Corp., Fairfax, Va.

[21] Appl. No.: 90,872

[22] Filed: Jul. 13, 1993

Related U.S. Application Data

[63] Continuation-in-part of Ser. No. 667,854, Mar. 12, 1991, Pat. No. 5,231,064.

[51] Int. Cl.⁵ ............................................. C01G 11/05
[52] U.S. Cl. ...................................... 208/114; 208/46
[58] Field of Search .................. 502/68, 81; 208/114, 208/46

[56] References Cited

U.S. PATENT DOCUMENTS

| | | | |
|---|---|---|---|
| 3,316,110 | 4/1967 | Herbst et al. | 106/65 |
| 3,354,096 | 11/1967 | Young | 252/435 |
| 3,867,279 | 2/1975 | Young | 208/114 |
| 4,356,338 | 10/1982 | Young | 585/407 |
| 4,454,241 | 6/1984 | Pine et al. | 502/68 |
| 4,567,152 | 1/1986 | Pine | 502/64 |
| 4,584,091 | 4/1986 | Pine | 208/114 |
| 4,839,319 | 6/1989 | Schuette et al. | 502/64 |
| 4,873,211 | 10/1989 | Walker et al. | 502/64 |
| 4,970,183 | 11/1990 | Nakamoto et al. | 502/68 |
| 5,082,815 | 1/1992 | Macedo | 502/68 |

FOREIGN PATENT DOCUMENTS 0358261  3/1990  European Pat. Off. .

*Primary Examiner*—Carl F. Dees
*Attorney, Agent, or Firm*—Alexander J. McKillop; Malcolm D. Keen; Dennis P. Santini

[57] ABSTRACT

A process is provided for converting feedstock hydrocarbon compounds over a catalyst composition which comprises clay and a zeolite component, at least one of which has been treated with a phosphorus-containing compound, for example, ammonium dihydrogen phosphate or phosphoric acid, and which is spray dried at a low pH, preferably lower than about 3. An embodiment of the present invention comprises an improved catalytic cracking process to produce high octane gasoline and increased lower olefins, especially propylene and butylene.

27 Claims, No Drawings

CATALYTIC CONVERSION WITH IMPROVED CATALYST

CROSS-REFERENCE TO RELATED APPLICATION

This is a continuation-in-part of application Ser. No. 07/667,854, filed Mar. 12, 1991, now U.S. Pat. No. 5,231,064.

FIELD OF THE INVENTION

The present invention relates to a process for converting, e.g., cracking, a hydrocarbon feed over a particular catalyst composition to produce conversion product hydrocarbon compounds of lower molecular weight than feed hydrocarbons, e.g., product comprising a high octane gasoline fraction, and lower olefins, especially propylene and butylene. The catalyst composition for use herein comprises the product of forming a slurry comprising clay, a source of phosphorus, and an acid stable zeolite component, and spray drying the slurry at a pH of below about 3.

BACKGROUND OF THE INVENTION

Catalytic cracking operations are commercially employed in the petroleum refining industry to produce useful products, such as high quality gasoline and fuel oils, from hydrocarbon-containing feeds. The endothermic catalytic cracking of hydrocarbons is most commonly practiced in accordance with two known catalytic cracking operations, namely, fluid catalytic cracking (FCC) and moving bed catalytic cracking.

Generally, both fluid catalytic cracking and moving bed hot, active, solid particulate catalyst without added hydrogen, for example, at pressures of up to about 50 psig and temperatures up to about 650° C. As the hydrocarbon feed is cracked in the presence of cracking catalyst to form more valuable and desirable products, undesirable carbonaceous residue known as "coke" is deposited on the catalyst. The spent catalyst contains coke as well as metals that are present in the feedstock.

In FCC operations, the catalyst is a fine powder with particle sizes of about 20-200 microns in diameter and with an average size of approximately 60-100 microns. The fine powder is propelled upwardly through a riser reaction zone, fluidized and thoroughly mixed with the hydrocarbon feed. The hydrocarbon feed is cracked at high temperatures by the catalyst and separated into various hydrocarbon products. The coked catalyst particles are separated from the cracked hydrocarbon products, and after stripping, are transferred into a regenerator where the coke is burnt off to regenerate the catalyst. The regenerated catalyst then flows downwardly from the regenerator to the base of the riser.

The cycles of cracking and regeneration at high flow rates and temperatures have a tendency to physically break down the catalyst into smaller particles, called "fines" which have a diameter of up to 20 microns as compared to the average diameter of the catalyst particle of about 60 to about 100 microns. In determining the unit retention of catalysts, and accordingly their cost efficiency, attrition resistance is a key parameter. While the initial size of the particles can be controlled relatively easily by controlling the initial spray drying of the catalyst, if the attrition resistance is poor, the catalytic cracking unit may produce a large amount of the 0-20 micron fines which should not be released into the atmosphere. Commercial catalytic cracking units include cyclones and electrostatic precipitators to prevent fines from becoming airborne. Those skilled in the art appreciate that excessive generation of catalyst fines increases the cost of catalyst to the refiner.

Additionally, the catalyst particles cannot be too large in diameter, or the particles may not be sufficiently fluidized. Therefore, the catalysts are preferably maintained under 120 to 150 microns in diameter.

Another consideration is deposition of coke on the catalyst particles which is generally considered undesirable for two reasons: first, it inevitably results in a decline in catalytic activity to a point where the catalyst is considered to have become "spent"; and second, coke generally forms on the catalyst at the expense of more desired light liquid products. To regenerate the catalytic activity, the hydrocarbon residues of the coke must be burnt off the "spent" catalyst at elevated temperatures in a regenerator.

Current worldwide refinery trends indicate a continuing need to process heavier feed stock. As a result, many refineries will be processing feedstock containing resids or deeper cut gas oils which have high metals contents. The enhancement of octane produced in catalytic cracking operations is an important goal in the preparation of zeolite containing catalysts. The environmental regulations in the United States and abroad, and the phaseout of lead additives for gasolines in both the U.S. and abroad, provide a strong incentive for refineries to use Therefore, it would be highly desirable to prepare a catalyst having a high attrition resistance. It would also be desirable to provide fluid catalysts having reduced manufacturing costs and improved catalytic activity for octane enhancement. Those skilled in the art will appreciate that improved attrition resistance as well as improved activity will translate into reduced catalyst makeup rates.

U.S. Pat. No. 5,110,776 teaches a method for preparing FCC catalyst comprising modifying the zeolite, e.g., ZSM-5, with phosphorus. U.S. Pat. No. 5,126,298 teaches manufacture of an FCC catalyst comprising zeolite, e.g., ZSM-5, clay, and phosphorus. Phosphorus treatment has been used on faujasite-based cracking catalysts for metals passivation (see U.S. Pat. No. 4,970,183 and 4,430,199); reducing coke make (see U.S. Pat. No. 4,567,152; 4,584,091; and 5,082,815); increasing activity (see U.S. Pat. No. 4,454,241 and 4,498,975); increasing gasoline selectivity (See U.S. Pat. No. 4,970,183); and increasing steam stability (see U.S. Pat. Nos. 4,765,884 and 4,873,211).

It is an object of the present invention to provide an improved cracking process using an improved catalyst.

It is a further object of the invention to provide for the use of an improved catalyst composition having suitable attrition resistance to impart an octane-enhancing property in the present catalytic cracking process, and to enhance production of light olefins, e.g., propylene and butylene.

SUMMARY OF THE INVENTION

These and other objects are achieved by the present invention which provides a process for converting feedstock hydrocarbon compounds to product hydrocarbon compounds of lower molecular weight than the feedstock hydrocarbon compounds which comprises contacting the feedstock at conversion conditions with catalyst comprising clay and a zeolite, at least one of which has been treated with a phosphorus-containing compound, for example, ammonium dihydrogen phosphate or phosphoric acid, and which is spray dried at a low pH, preferably lower than about 3. More particularly, the invention provides a hydrocarbon cracking process which uses a catalyst composition comprising clay and a zeolite, at least one of which has been treated with a phosphorus-containing compound, for example, ammonium dihydrogen phosphate or phosphoric acid, and which is spray dried at a low pH, preferably lower than about 3. The catalyst for use herein exhibits significantly reduced attrition.

The catalyst composition for use herein is prepared by forming a slurry comprising clay, a source of phosphorus, and an acid stable zeolite, e.g., ZSM-5, and spray drying the slurry at a pH of less than about 3, optionally in the absence of any other non-zeolitic inorganic oxide material.

In the process for cracking a hydrocarbon feedstock, the feedstock is contacted under catalytic cracking conditions with the catalyst composition to yield the improved product.

DETAILED DESCRIPTION

In catalytic cracking, high molecular weight hydrocarbons are converted to lower molecular weight hydrocarbons of suitable volatility to permit their use as liquid fuels. The combustion characteristics of gasoline are assessed empirically by assigning the fuel an octane rating. This is generally defined as a comparison with a primary reference which is the percentage of iso-octane (2,2,4-trimethylpentane) in an n-heptane/iso-octane mixture to which the gasoline under examination is equivalent in terms of combustion behavior when considering the octane ratings of n-heptane and iso-octane to be zero and 100 respectively. Both RON and MON can be tested on the same single-cylinder, four-stroke engine of standardized design. RON signifies the research octane number, MON signifies the motor octane number, and the terms are used to describe the knocking characteristics of gasoline, that is, its combustion behavior. For a measurement of RON, the engine speed used is 600 rpm which yields results comparable to an automobile engine operated at low speed. For a measurement of MON, the engine speed is 900 rpm which approximates higher speed cruising conditions. Generally, higher octane numbers are found by the research method compared to the motor method for the same gasoline sample. The average of the RON and MON, known as the road octane number, gives an indication of typical performance in an engine. The higher the octane, the better the combustion behavior in a spark-ignition engine. It has been found that road octane number correlates much more closely to the motor octane number than the research octane. Generally, aromatics and branched paraffinic and olefinic hydrocarbons have higher octane values than acyclic or linear paraffinic hydrocarbons.

In conjunction with catalytic cracking to produce gasoline product, alkylate and potential alkylate may result from the cracking process. This indirectly leads to product of increased octane because high octane, highly branched paraffinic gasoline blending stocks are produced principally by alkylation of $C_3$ and $C_4$ olefins with isobutane. Unlike cracking, alkylation makes larger branched hydrocarbons from smaller hydrocarbons and these larger branched hydrocarbons are inherently higher in octane.

The present process provides not only a high octane product, but significantly more light olefins, especially propylene and butylene. The lower olefins of this product are high quality, petrochemical grade, and may be used for manufacture of valuable ethers and/or alcohols, or as alkylating agents.

FEEDS

The feedstock, that is, the hydrocarbons to be cracked, may include in whole or in part, a gas oil (e.g., light, medium, or heavy gas oil) having an initial boiling point above about 204° C., a 50 % point of at least about 260° C., and an end point of at least about 315° C. The feedstock may also include deep cut gas oil, vacuum gas oil, thermal oil, residual oil, cycle stock, whole top crude, tar sand oil, shale oil, synthetic fuel, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils having an end point of up to about 700° C., even with high metals contents, can also be cracked using the invention.

PROCESS

The present invention provides a process for converting feedstock hydrocarbon compounds to product hydrocarbon compounds of lower molecular weight than the feedstock hydrocarbon compounds. In particular, the present invention provides a process for catalytically cracking a hydrocarbon feed to a mixture of products comprising gasoline, alkylate, potential alkylate, and lower olefins, e.g., propylene, in the presence of a cracking catalyst under catalytic cracking conditions. Catalytic cracking units which are amenable to the process of the invention operate at temperatures from about 400° C. to about 650° C., usually from about 450° C. to about 600° C., and under reduced, atmospheric, or superatmospheric pressure, usually from about atmospheric to about 5 atmospheres. The catalytic process can be either fixed bed, moving bed, transfer line, or fluidized bed, and the hydrocarbon flow may be either concurrent or countercurrent to the catalyst flow. The process of the invention is particularly applicable to the Fluid Catalytic Cracking (FCC) or Thermofor Catalytic Cracking (TCC) processes. In both of these processes, the hydrocarbon feed and catalyst are passed through a reactor and the catalyst is regenerated. The two processes differ substantially in the size of the catalyst particles and in the engineering contact and transfer which is at least partially a function of catalyst size.

The TCC process is a moving bed and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated.

Typically preferred TCC conversion conditions include an average reactor temperature of from about 450° C. to about 540° C.; catalyst/oil volume ratio of from about about 2 to about 7; reactor volume hourly space velocity of from about about 1 to about 5 vol./hr./vol.; and recycle to fresh feed ratio of from 0 to about 0.5 (volume).

The process of the invention is particularly applicable to Fluid Catalytic Cracking. In fluidized catalytic cracking processes, the catalyst is a fine powder of about 10 to 200 microns. This powder is generally suspended in the feed and propelled upward in a reaction zone. A relatively heavy hydrocarbon feedstock, e.g., a gas oil, is admixed with a suitable cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed with primary-absorber bottoms and stripper overhead gas through a cooler to the high pressure receiver. Gas from this receiver is routed to the primary absorber, where it is contacted by the unstabilized gasoline from the main-column overhead receiver. The net effect of this contacting is a separation between $C_3+$ and $C_2-$ fractions in the feed to the primary absorber. Primary absorber off-gas is directed to a secondary or sponge absorber, where a circulating stream of light cycle oil from the main column is used to absorb most of the remaining $C_5+$ material in the sponge absorber feed. Some $C_3$ and $C_4$ materials are also absorbed. The sponge-absorber rich oil is returned to the FCC main column. The sponge-absorber overhead, with most of the valuable $C_4+$ material removed but including $H_2S$, is sent to the fuel gas or other process streams.

Liquid from the high pressure separator is sent to a stripper where most of the $C_2-$ is removed overhead and sent back to the high pressure separator. The bottoms liquid from the stripper is sent to the debutanizer, where an olefinic $C_3-C_4$ product is further separated for gasoline production. The debutanizer bottoms, that is, the stabilized gasoline, is sent to treating, if necessary, and then to storage. The $C_3$ and $C_4$ product olefins can be directed to an alkylation unit to produce a high octane gasoline by the reaction of an iso-paraffin (usually iso-butane) with one or more of the low molecular weight olefins (usually propylene and butylene).

The FCC conversion conditions include a riser top temperature of from about 500° C. to about 595° C., preferably from about 520° C to about 565° C., and most preferably from about 530° C. to about 550° C.; catalyst/oil weight ratio of from about 3 to about 12, preferably from about 4 to about 11, and most preferably from about 5 to about 10; and catalyst residence time of from about 0.5 to about 15 seconds, preferably from about 1 to about 10 seconds.

CATALYST

One preferred embodiment of the present invention comprises use of a fluid catalyst formed from a zeolite component and a phosphorus treated clay. The catalyst of the present invention exhibits greater attrition resistance, as well as a higher catalytic activity for gasoline octane enhancement or light olefin production, than catalysts similarly formed without the phosphoric acid treatment of the clay.

Those skilled in the art will appreciate that one conventional method of forming catalysts is to add a zeolite slurry to a clay slurry, thoroughly mix the slurry mixture to form a single homogeneous slurry, and then spray dry that mixture. The spray dried catalyst may then be calcined to further increase the attrition resistance.

A catalyst for one embodiment of the present invention is prepared in a modified method wherein the clay slurry is mixed with a source of phosphorus, e.g., phosphoric acid, prior to mixing with the zeolite component slurry. The term "zeolite" as used herein designates the class of porotectosilicates, i.e., porous crystalline silicates, which contain silicon and oxygen atoms as the major components. Other framework components can be present in minor amount, usually less than about 14 mole %, and preferably less than 4%. These components include aluminum, gallium, iron, boron, etc., and combinations thereof. The crystalline aluminosilicates constitute an especially well known type of zeolite. Unless otherwise noted, all percentages herein are based on total solids.

According to a preferred method of the present invention, the catalyst results from a procedure whereby after the clay/phosphoric acid slurry has been added to the zeolite component slurry and any desired adjustments have been made to the solids percentage, the pH of the slurry mixture is adjusted to below about 3, most preferably to about 2 or below, prior to spray drying. It has been found that these pH ranges are suitable for obtaining a satisfactory attrition resistance.

The catalyst for use in the present invention may be formed in the absence of other non-zeolitic inorganic oxide matrices. As used herein, the phrase "other non-zeolitic inorganic oxide matrices" is meant to include oxide matrices such as silica, alumina, silica-alumina, magnesia, boria, titania, zirconia and mixtures thereof. The catalyst matrix of the present invention need not contain any added silica and/or alumina which is introduced as gels or sols.

In an embodiment of the present invention, the catalyst composition may include metals useful in promoting the oxidation of carbon monoxide to carbon dioxide under catalyst regeneration conditions as described in U.S. Pat. No. 4,072,600 and 4,350,614, the entire contents of each incorporated herein by reference. Examples of this embodiment include addition to the catalyst composition for use herein trace amounts of oxidation promoter selected from the group consisting of platinum, palladium, iridium, osmium, rhodium, ruthenium, rhenium, and combination thereof. The catalyst composition may comprise, for example, from about 0.01 ppm to about 100 ppm by weight oxidation promoter, usually from about 0.01 ppm to about 50 ppm by weight, preferably from about 0.01 ppm to about 5 ppm by weight.

In light of the relatively low pH of the catalyst preparation slurry prior to spray drying, the zeolite used in practicing the present invention should be acid stable at a Ph below about 3, most preferably in the pH range of from about 1 to about 2. As used herein, the term "acid stable" means that the zeolite will undergo only minimal removal of framework components, for example, aluminum, gallium, iron, boron, etc. which are usually present in minor amounts, in the stated pH range. Suitable acid stable zeolites have $SiO_2/Al_2O_3$ molar ratios at least about 20/1, preferably at least about 23/1, and most perferably at least about 35/1.

The zeolite component may be a large pore crystalline material having pore openings of greater than about 7 Angstroms diameter such as, for example, zeolites REY, USY, REUSY, dealuminated Y, ultrahydrophobic Y, silicon-enriched dealuminated Y, ZSM-20, Beta, L, silicoaluminophosphates SAPO-5, SAPO-37, SAPO-40, MCM-9, metalloaluminophosphate MAPO-36, aluminophosphate VPI-5, or mesoporous crystalline material MCM-41; or an intermediate pore crystalline material having pore openings of from about 4 Angstroms to about 7 Angstroms diameter such as, for example, zeolites ZSM-5, ZSM-11, ZSM-22, ZSM-23, ZSM-35, ZSM-48, ZSM-57, or silicoaluminophosphate SAPO-31; or small pore zeolite having pore openings of less than about 4 Angstroms diameter including, for example, erionite and ZSM-34. The zeolite component for use herein may be a mixture of large pore, intermediate pore, and/or small pore crystalline materials. A non-limiting example of this includes the combination of acid-stable zeolite having the structure of ZSM-5 having a $SiO_2/Al_2O_3$ mole ratio of greater than about 20/1, e.g., about 55/1, and acid-stable zeolite selected from the group consisting of USY, REY, and REUSY.

According to the present invention the zeolite $SiO_2/Al_2O_3$ ratio is advantageously sufficiently high to minimize framework dealumination in the stated pH range. The high $SiO_2/Al_2O_3$ ratio zeolite can either be synthesized directly or can be obtained by, for example, steaming, or steaming followed by acid dealumination of a low $SiO_2/Al_2O_3$ ratio zeolite. The phosphorus-containing catalyst for use herein shows improved catalytic performance over phosphorus-free analogs.

The zeolite slurry is mixed with the phosphoric acid/clay slurry and the slurry solids are preferably adjusted to about 25% by weight. It may be necessary to adjust the pH of this slurry, particularly when sources of phosphorus other than phosphoric acid are utilized. After thorough mixing, the slurry is spray dried at a temperature of, for example, from about 100° C. to about 250° C., and, preferably, calcined, for example, at temperatures ranging from about 200° C. to about 650° C. for time periods of from about 1 minute to about 48 hours. For example, the catalyst for use in the present invention may comprise from about 10 wt % to about 20 wt % zeolite, from about 5 wt % to about 10 wt % phosphorus (P2O5), and from about 70 wt % to about 85 wt % clay.

Suitable sources of phosphorus for use in preparing the catalyst used in the present invention include phosphoric acid, ammonium dihydrogen phosphate, ammonium monohydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, and mixtures thereof.

The following examples are provided to further illustrate the present invention. A series of ZSM-5 fluid catalysts containing 15% by weight of 55/1 $SiO_2/Al_2O_3$ ZSM-5, clay and phosphoric acid were prepared. As a control, in Example 1 a catalyst comprising ZSM-5 and clay was prepared without the phosphoric acid treatment. Catalyst preparations illustrating the benefits of phosphoric acid treatment are described in Examples 2 through 16. In these example, percentages are by weight unless otherwise indicated.

ATTRITION TEST

To determine the attrition index (AI) of the fluid catalysts prepared hereinafter, 7.0 cc of sample catalyst was contacted in a 1.0 inch U-tube with an air jet formed by passing humidified (60%) air through a 0.07 inch nozzle at 21 litre/minute for 1 hour. The attrition index is defined as the percent of 0-20 micron fines generated during the test relative to the amount of >20 micron material initially present.

$$AI = 100 \times \frac{\text{wt \% of fines } AA - \text{wt \% fines } BA}{100 - \text{wt \% of fines } BA},$$

where AA means after attrition; BA means before attrition and fines means wt % of 0-20 micron material. The lower the attrition index, the more attrition resistant is the catalyst.

EXAMPLE 1

A slurry containing 375 grams of dried 55/1 $SiO_2/Al_2O_3$ ZSM-5 crystals and 2.5 grams of Marasperse N-22 dispersant (Daishowa Chemicals Inc., Rothchild, WI) was diluted to 33% solids with deionized water and ballmilled for 16 hours in a one-gallon porcelain ballmill containing agate stones. After ball-milling, the slurry was recovered and rinse water was added to the slurry to reduce the solids content to 20 wt %. A clay slurry was separately prepared by combining 2456.2 grams of Kaolin (86.51% solids) (Georgia Kaolin Company, Elizabeth, NJ) and 2652.6 grams of deionized water. The pH of the clay slurry was 6.73 at 20° C. In a stirred vessel, the clay slurry was further diluted by adding 2107 grams of deionized water. Next, the zeolite slurry was added to the clay slurry and the slurry solids was adjusted to 25 wt %. After homogenization, the slurry was spray dried. A portion of the resulting catalyst, labeled catalyst "A" was calcined for 2 hours at 648° C. in air. The catalyst consisted of 15% ZSM-5 and 85% clay.

The uncalcined as well as the calcined catalysts prepared in this example were subjected to the Attrition Test. They attrited completely to fines in 10 minutes after having been charged to the U-tube.

Example 2

A zeolite slurry containing 375 grams of 55/1 $SiO_2/Al_2O_3$ ZSM-5 (dry basis) at 20% solids was prepared as described in Example 1. A 5109 gram quantity of clay slurry was prepared containing 1953.5 grams of Kaolin (dry basis). In addition, an $H_3PO_4$ solution was prepared by adding 275.3 grams of 86.1 wt % $H_3PO_4$ to 1974 grams of deionized water. The $H_3PO_4$ solution was gradually added to the clay slurry followed by 15 minutes of stirring. The contact time, i.e., the time that the $H_3PO_4$ was in contact with the clay prior to adding the zeolite, was 95 minutes. The final pH of the phosphoric acid treated clay slurry was 1.28. After combining the $H_3PO_4$ solution and the clay slurry in a stirred vessel, the zeolite slurry was added. A 909 gram quantity of deionized water was then added. The pH of the slurry was 1.5. Additional deionized water was added to adjust the percent solids of the slurry at 25%. After homogenization, the slurry was spray dried. The resulting catalyst, labelled catalyst "B" was calcined for 2 hours at 648° C. in air. This catalyst consisted of 15% ZSM-5, 78.1% kaolin and 6.9% $P_2O_5$.

The attrition indices of the spray-dried and the calcined catalysts prepared in this example were 15 and 9, respectively. Comparison of the attrition test results for the catalysts in Examples 1 and 2 illustrates the benefits of treating the clay with phosphoric acid at a low pH.

Examples 3 through 5

To assess the impact of phosphorus loading on catalyst attrition resistance, three ZSM-5-containing fluid catalysts were prepared using substantially the same procedure as outlined in Example 2. In the three preparations, respectively labelled catalysts "C", "D", and "E" the amount of phosphoric acid and clay added were varied such that the zeolite content remained constant at 15.1+0.1%. The results are summarized below:

TABLE 1

Effect of Phosphoric Acid Level on Attrition Resistance
55/1 $SiO_2/Al_2O_3$ ZSM-5 Fluid Catalysts

| Catalyst | Composition | | | Attrition Index | |
|---|---|---|---|---|---|
| | Zeolite (wt. %) | Clay (wt %) | $P_2O_5$ (wt %) | Spray-Dried | Calcined |
| C | 15.1 | 82.0 | 2.9 | 71 | 61 |
| D | 15.0 | 78.1 | 6.9 | 21 | 7 |
| B | 15.0 | 78.1 | 6.9 | 15 | 9 |
| E | 15.2 | 75.9 | 8.9 | 4 | 4 |

The results show that, in a zeolite with a $SiO_2/Al_2O_3$ mole ratio of 55/1, $P_2O_5$ levels >2.9 wt %, preferably >6.9 wt %, are required to obtain fluid catalysts with significantly reduced attrition indices. For convenience, the amount of phosphorus present is reported as $P_2O_5$.

Examples 6 through 10

To assess the impact of zeolitic $SiO_2/Al_2O_3$ mole ratio on catalyst attrition resistance, five zeolite-containing fluid catalysts were prepared using substantially the same procedure as outlined in Example 2. In the five preparations, labelled catalysts "F"-"J" only the zeolite was varied. In other respects, the compositions were not changed. The results are as summarized below:

TABLE 2

| Catalyst | Nominal $SiO_2/Al_2O_3$ (Zeolite-Type) | pH | Attrition Index | |
|---|---|---|---|---|
| | | | Spray-Dried | Calcined |
| F | 5/1 (USY) | 2.6 | 69 | 87 |
| G | 26/1 (ZSM-5) | 1.5 | 55 | 17 |
| H | 55/1 (ZSM-5) | 1.5 | 15 | 9 |
| I | 500/1 (ZSM 5) | 1.6 | 15 | 7 |
| J | 500/1 (ZSM-5) | 1.9 | 17 | 3 |

The attrition results show that as the zeolitic $SiO_2/Al_2O_3$ mole ratio increases from 5/1 to 500/1 and as the zeolite becomes more acid stable, the attrition indices of the spray-dried and calcined catalysts decrease dramatically.

Examples 11 through 16

To ascertain the effect of slurry pH on attrition resistance, six ZSM-5 catalysts, labelled catalysts "K"-"P" were prepared which consisted of 15% zeolite, 78.1% clay and 6.9% $P_2O_5$.

A zeolite slurry containing 375 grams of 55/1 $SiO_2/Al_2O_3$ ZSM-5 (dry basis) was prepared as described in Example 1. A 5109 gram quantity of clay slurry was prepared containing 1953.5 grams of Kaolin (dry basis). In addition, an $H_3PO_4$ solution was prepared by adding 275.3 grams of 86.1 wt % $H_3PO_4$ to 1974 grams of deionized water. After combining the $H_3PO_4$ solution and the clay slurry in a stirred vessel, the zeolite slurry was added. An additional 909 grams of deionized water were added to adjust the percent solids of the slurry. Next, a dilute solution of $NH_4OH$ or $HNO_3$ was prepared and added to the slurry to adjust the slurry pH to the desired level. Additional deionized water was added to adjust the slurry solids to about 24 wt %. After homogenization, the slurry was spray dried. The resulting catalysts were calcined for 2 hours at 648° C. in air. The slurry pH was varied from 1 to 10. The results are summarized below:

TABLE 3

Effect of Slurry pH on Attrition Resistance

| Catalyst | Slurry pH | Attrition Index | |
|---|---|---|---|
| | | Spray-Dried | Calcined |
| K | 1.0 | 22 | 8 |
| L | 2.0 | 25 | 7 |
| M | 3.0 | 59 | 20 |
| N | 4.6 | 46 | 28 |
| O | 6.5 | 76 | 30 |
| P | 10 | 43 | 17 |

The results demonstrate that at a zeolite content of 15 wt. % and a $P_2O_5$ content of 6.9 wt. %, the slurry pH prior to spray drying should be maintained at <3, preferably ≦2, to obtain a fluid catalyst with a low attrition index.

Example 17

The base catalyst employed in the present study was a commercially-available REY-type catalyst which had been removed from a commercial FCC unit following oxidative regeneration. This catalyst is hereinafter referred to as catalyst "Q".

Example 18

A commercially manufactured 25% ZSM-5 additive catalyst was steam-deactivated at 788° C. for 10 hours in 45% steam/55% air at 0 psig. The resulting catalyst was blended with catalyst Q to a ZSM-5 concentration of 2 wt. %. The blend prepared in this example will be referred to as catalyst "R".

Example 19

A large batch of catalyst was prepared according to the procedure employed for preparing catalyst N. This catalyst, labelled catalyst "S" was calcined for 3 hours at 648° C. in air; a heating rate of 165° C./hour was used. The resulting catalyst referred to as catalyst "T" was steam-deactivated at substantially the same conditions as the catalyst in Example 18. The steamed catalyst labelled "U" was blended with catalyst Q to a ZSM-5 concentration of 0.3 wt. %. The blend prepared in this example will be referred to as catalyst "V".

Catalysts Q, R, and V were evaluated for cracking a Sour Heavy Gas Oil, having the properties listed in Table 4, in a fixed-fluidized bed (FFB) unit at 515° C. over a range of catalyst/oil ratios. The performance of the three catalysts at 65 vol% conversion was determined via interpolation; the results are shown in Table 5. Yield/octane shifts for catalysts R and V have been summarized in Table 6. The data show that Catalyst V is substantially more active for octane enhancement (change in Research Octane Number (RON)/wt % ZSM-5 of 11.7 vs. 0.6) than catalyst R without significant loss in selectivity (−change in C5+ gasoline/change in RON of 2.2 vs. 2.8).

TABLE 4

Properties of a Sour Heavy Gas Oil

| Pour Point, °F. | 90 |
|---|---|
| CCR, wt % | 0.34 |
| K.V. @ 40° C. | 38.8 |
| K.V. @ 100° C. | 5.56 |
| Aniline Point, °F. | 162.5 |
| Bromine Number | 4.3 |
| Gravity, API | 21.8 |
| Carbon, wt % | 87.3 |
| Hydrogen, wt % | 12.6 |
| Sulfur, wt % | 2.46 |
| Nitrogen, wt % | 0.12 |
| Basic Nitrogen, ppm | 336 |
| Nickel, ppm | 0.2 |
| Vanadium, ppm | 0.7 |
| Iron, ppm | 3.3 |
| Copper, ppm | <0.1 |
| Sodium, ppm | 0.8 |

TABLE 5

FFB Performance of Catalysts Q, R, and V
Yield/Octane Estimates at 65 vol % Conversion

| Catalyst | Q | R | V |
|---|---|---|---|
| Coke, wt % | 4.4 | 4.6 | 4.7 |
| $C_1$-$C_3$, wt % | 7.5 | 8.8 | 12.0 |
| $C_4$, wt % | 8.8 | 9.8 | 10.8 |
| $C_5+$ gasoline, wt % | 42.2 | 39.5 | 35.8 |
| LFO, wt % | 30.2 | 30.2 | 30.2 |
| HFO, wt % | 7.1 | 7.0 | 6.7 |
| RON | 89.6 | 90.7 | 93.1 |
| $C_5+$ gasoline, vol % | 50.9 | 47.8 | 43.1 |
| $C_3^=$ + $C_4^=$ + $iC_4$, vol % | 19.5 | 23.5 | 30.4 |

TABLE 6

FFB Performance of Catalysts R and V
Yield/Octane Shifts at 65 vol % Conversion

| Catalyst | R | V |
|---|---|---|
| -change in $C_5+$ gasoline, vol % | 3.1 | 7.8 |
| change in $C_3^=$ + $C_4^=$ + $iC_4$, vol % | 4.0 | 10.9 |
| change in RON | 1.1 | 3.5 |
| change in RON/wt % ZSM-5 | 0.6 | 11.7 |
| Selectivity (-change in $C_5+$ gasoline/change in RON) | 2.8 | 2.2 |

The preparation of the catalysts at a slurry pH of 1.0 (K), 2.0 (L), 3.0 (M), 4.6 (N) and 6.5 (O) is described above. catalysts (B and D) spray dried at a slurry pH of 1.5 and 1.8, respectively, were also described above.

Each of spray dried catalysts B, D, K, L, M, N, and O described above was calcined for 3 hours at 648° C. in air and then steam-deactivated at substantially the same conditions as the catalyst in Example 18.

The steamed ZSM-5 catalysts were blended with catalysts Q to a ZSM-5 concentration of 0.3 wt %. The blends prepared in these examples will be referred to as catalyst K2 (pH=1), catalyst D2 (pH=1.8), catalyst B2 (pH=1.5 ), catalyst L2 (pH=2), catalyst M2 (pH=3), catalyst N2 (pH=4.6), and catalyst 02 (pH=6.5).

These catalysts were evaluated for cracking a Sour Heavy Gas Oil in a fixed-fluidized bed unit at 515° C. over a range of catalyst/oil ratios. Properties of this chargestock are summarized in Table 7. The performance of the catalysts was determined at 65 vol% conversion via interpolation and catalyst activity for octane enhancement (change in RON/wt % ZSM-5) and selectivity (−change in C5+ gasoline/change in RON) were calculated. The results are summarized in Table 8. The data in Table 8 indicate that slurry pH does not significantly impact catalytic performance.

TABLE 7

Properties of a Sour Heavy Gas Oil

| Pour Point, °F. | 90 |
|---|---|
| CCR, wt % | 0.54 |
| K.V. @ 40° C. | N/A |
| K.V. @ 100° C. | 8.50 |
| Aniline Point, °F. | 170.5 |
| Bromine Number | 8.7 |
| Carbon, wt % | 87.1 |
| Hydrogen, wt % | 12.1 |
| Sulfur, wt % | 2.1 |
| Nitrogen, wt % | 0.41 |
| Basic Nitrogen, ppm | 382 |
| Nickel, ppm | 0.3 |
| Vanadium, ppm | 0.4 |
| Iron, ppm | 0.3 |
| Copper, ppm | 20 |
| Sodium, ppm | 1.3 |

TABLE 8

Catalytic Performance of
Phosphoric Acid-Treated ZSM-5/Clay Additive Catalysts

| Catalyst | Q | K2 | D2 | B2 | L2 | M2 | N2 | O2 |
|---|---|---|---|---|---|---|---|---|
| Slurry pH | Eq. REY | 1.0 | 1.8 | 1.5 | 2.0 | 3.0 | 4.6 | 6.5 |
| Conversion, Vol % | | | ← 65 → | | | | | |
| Coke, wt % | 5.0 | 4.7 | 5.2 | 4.7 | 4.7 | 4.7 | 5.0 | 4.5 |
| $C_1$-$C_3$, wt % | 7.4 | 10.3 | 9.3 | 12.1 | 12.1 | 10.7 | 11.0 | 10.0 |
| $C_4$, wt % | 7.5 | 10.8 | 9.8 | 11.4 | 10.5 | 10.3 | 11.3 | 11.3 |
| $C_5+$ gasoline, wt % | 42.6 | 36.5 | 38.0 | 34.3 | 35.0 | 36.4 | 35.0 | 36.0 |
| LFO, wt % | 29.2 | 30.1 | 29.6 | 29.4 | 29.8 | 29.7 | 29.5 | 29.9 |
| HFO, wt % | 8.3 | 7.8 | 8.0 | 8.4 | 7.9 | 8.1 | 8.1 | 7.9 |
| RON | 90.7 | 92.7 | 92.8 | 93.4 | 92.7 | 93.6 | 93.5 | 93.5 |
| -change in $C_5+$ gasoline (vol %)/change in RON | | 3.8 | 2.6 | 3.9 | 4.7 | 2.6 | 3.4 | 2.9 |
| change in RON/wt % ZSM-5 | | 6.7 | 7.0 | 9.0 | 6.7 | 9.7 | 9.3 | 9.3 |

Each of spray-dried catalysts C, D, B, and E was calcined at 648° C. for 3 hours in air and steam deactivated at substantially the same conditions as the catalyst in Example 18. The steamed catalysts were blended with catalyst Q to a ZSM-5 concentration of 0.3 wt %. The blends will be referred to as catalysts C2, D2, B2, and E2. Catalytic results showing the negligible effect of P2O5 content on ZSM-5 FCC additive performance, over the P2O5 range examined, are detailed below in Table 9.

TABLE 9
EFFECT OF P₂O₅ CONTENT ON ZSM-5 ADDITIVE CATALYST PERFORMANCE

| Catalyst | Q | C2 | D2 | B2 | E2 |
|---|---|---|---|---|---|
| $P_2O_5$, content, wt % | Eq. REY | 2.9 | ← 6.9 → | | 8.9 |
| Yields, wt % (@ 65 vol % conv.) | | | | | |
| Coke | 5.0 | 4.7 | 5.2 | 4.7 | 5.0 |
| $C_1$-$C_3$ | 7.4 | 11.7 | 9.3 | 12.1 | 10.5 |
| $C_4$ | 7.5 | 11.3 | 9.8 | 11.4 | 9.9 |
| $C_5+$ gasoline | 42.6 | 34.5 | 38.0 | 34.3 | 36.7 |
| LFO | 29.2 | 29.6 | 29.6 | 29.4 | 29.8 |
| HFO | 8.3 | 8.3 | 8.0 | 8.4 | 8.1 |
| RON | 90.7 | 93.5 | 92.8 | 93.4 | 92.8 |
| -change in $C_5+$ Gasoline (vol %)/change in RON | | 3.5 | 2.6 | 3.9 | 3.5 |
| change in RON/wt % ZSM-5 | | 9.3 | 7.0 | 9.0 | 7.0 |

The following examples illustrate the advangates of one preferred embodiment of the present invention wherein the contact time between the phosphoric acid and the clay slurry is limited. As illustrated in these examples, even further improvements is attrition resistance are obtained. It is believed that by reducing the contact time between the source of phosphorus and the clay prior to zeolite addition, more bonding occurs between the phosphorus and the zeolite leading to better attrition resistance.

For comparative purposes, catalysts B and D were used as an example of a phosphorus-treated ZSM-5/clay catalyst prepared in a manner such that the contact time between the phosphoric acid and the clay prior to zeolite addition to the slurry was not limited.

EXAMPLE 20

A zeolite slurry containing 375 g of 55/1 $SiO_2/Al_2O_3$ ZSM-5 (dry basis) at 20% solids was prepared in the manner described in Example 1. A 5109 gram quantity of a clay slurry was prepared containing 1953.5 grams of Kaolin. In addition, an $H_3PO_4$ solution was prepared by adding 275.7 grams of 86% $H_3PO_4$ to 1974 grams of deionized water. The $H_3PO_4$ solution was added to the clay slurry over an 85 minute period. The final pH of the phosphoric acid-treated clay slurry was 1.27. Next, the zeolite slurry was added and the resulting slurry was stirred for an additional 15 minutes. An additional 909 grams of deionized water were then added; the final slurry pH was 1.53. The mixture was allowed to age for 48 hours with stirring. Additional deionized water was added to adjust the solids percentage of the slurry to 25%. After homogenization, the slurry was spray dried. The resulting catalyst, labelled catalyst "Y" was calcined for 2 hours at 648° C. in air.

The attrition indices of the spray-dried and the calcined catalysts prepared in the present example were determined to be 14 and 10, respectively. Since the attrition indices of catalysts B and Y are equivalent, it was deemed that the 48-hour aging of the phosphoric acid/clay/zeolite slurry did not affect attrition resistance.

EXAMPLE 21

A zeolite slurry containing 375 grams of 55/1 $SiO_2/Al_2O_3$ ZSM-5 (dry basis) at 20% solids was prepared in the manner described in Example 1. A 5109 gram quantity of a clay slurry was prepared containing 1953.5 grams of Kaolin clay. In addition, an $H_3PO_4$ solution was prepared by adding 275.3 grams of 86.1% $H_3PO_4$ to 1974 grams of deionized water. The $H_3PO_4$ solution was added to the clay slurry over an 11 minute period. The final pH of the phosphoric acid-treated clay slurry was 1.27. Next, the zeolite slurry was added and the resulting slurry was stirred for an additional 15 minutes. An additional 909 grams of deionized water were then added; the pH was 1.53. Deionized water was added to adjust the solids percentage of the slurry to 25%. After homogenization, the slurry was spray dried. The resulting catalyst, referred to as catalyst "Z" was calcined for 2 hours at 648° C. in air.

The attrition indices of the spray-dried and the calcined catalysts prepared in the present example were determined to be 11 and 6, respectively.

Example 22

A zeolite slurry containing 375 grams of 55/1 $SiO_2/Al_2O_3$ ZSM-5 (dry basis) at 20% solids was prepared as described in Example 1. A 5109 gram quantity of a clay slurry was prepared containing 1953.5 grams of Kaolin clay. In addition, an $H_3PO_4$ solution was prepared by adding 275.7 grams of 86% $H_3PO_4$ to 1974 grams of deionized water. The $H_3PO_4$ solution was added to the zeolite slurry over a 15 minute period. The final pH of the phosphoric acid-treated zeolite slurry was 1.35. Next, the phosphoric acid/zeolite slurry was added to the clay slurry over an 11 minute period with stirring. The resulting slurry was stirred for an additional 15 minutes. An additional 909 grams of deionized water were then added; the pH was 1.64. Deionized water was added to adjust the solids percentage of the slurry to 25%. After homogenization, the slurry was spray dried. The resulting catalyst, referred to as catalyst "AA", was calcined for 2 hours at 648° C. in air.

The attrition indices of the spray dried and the calcined catalysts prepared in the present example were determined to be 7 and 8, respectively. A repeat evaluation yielded attrition indices of 10 and 6, respectively. Average uncalcined and calcined attrition indices of 8 and 7 were obtained indicating that upon calcination of the catalyst of this example, the attrition index decreases by only one number.

The attrition results, summarized in Table 10, show that a significant improvement in the attrition index is obtained by minimizing the contact time between the phosphoric acid and the clay prior to zeolite addition to the slurry. The improvement in attrition resistance is due predominantly to an improvement in the uncalcined attrition index.

TABLE 10

| | Attrition Indices of P/ZSM-5 Catalysts | | |
|---|---|---|---|
| | Time Phosphorus is in | Attrition Index | |
| Catalyst | Contact with Clay Prior to Addition of ZSM-5 | Spray Dried | Calcined |
| A | No phosphorus | 100 | 100 |
| D | 95 min | 21 | 7 |
| B | 95 min | 15 | 9 |
| Y | 85 min[1] | 14 | 10 |
| Z | 11 min | 11 | 6 |
| AA | 0 min | 8 | 7 |

[1]Followed by 48 hours of aging of the P/ZSM-5/clay slurry

Each of spray dried catalysts B, D, and AA was calcined at 648° C. for 3 hours in air and was steam-deactivated at substantially the same conditions as the catalyst described in Example 18. The steamed catalysts were blended with catalyst Q to a ZSM-5 concentration of 0.3 wt %. The blends will be referred to as catalysts "B2", "D2", and "AA2".

Minimizing the contact time according to this preferred embodiment does not substantially affect catalytic performance. Catalytic results from Table 11 illustrate the negligible effect of minimizing contact time in the catalyst preparation on ZSM-5 FCC additive performance.

TABLE 11

| Catalyst | Q | D2 | B2 | AA2 |
|---|---|---|---|---|
| Contact Time, Min. | — | ←  95 → | | 0 |
| Yield Distribution wt % (@ 65 vol % conv.) | | | | |
| Coke | 5.0 | 5.2 | 4.7 | 4.6 |
| $C_1$-$C_3$ | 7.4 | 9.3 | 12.1 | 9.1 |
| $C_4$ | 7.5 | 9.8 | 11.4 | 10.3 |
| $C_5$+ gasoline | 42.6 | 38.4 | 34.3 | 38.2 |
| LFO | 29.2 | 29.6 | 29.4 | 28.8 |
| HFO | 8.3 | 8.0 | 8.4 | 8.6 |
| RON | 90.7 | 92.8 | 93.4 | 92.6 |
| Change in $C_5$+ gasoline(vol %)/ change in RON | | 2.7 | 3.9 | 2.7 |
| Change in RON/ wt % ZSM-5 | | 7.0 | 9.0 | 6.3 |

The following example was performed to test the effect of combining the phosphoric acid with the zeolite slurry prior to ball milling.

Example 23

A slurry containing 375 grams of dried ZSM-5 (dry basis) and 2.3 grams of Maraspere N-22 dispersant was diluted to 33% solids by adding 275.3 grams of 86.1 wt % $H_3PO_4$ and deionized water and, subsequently, ball-milled for 16 hours in a one-gallon porcelain ballmill containing agate stones. After ball-milling, the slurry was recovered and rinse water was added to the slurry to reduce the solids content to 24.4 wt %. A 7083 gram quantity of a clay slurry was prepared containing 1953.3 grams of Kaolin (dry basis). After combining the zeolite/$H_3PO_4$ slurry and the clay slurry over a 90 minute period, 909 grams of deionized water was added. The pH of the slurry was 1.9. Additional deionized water was added to adjust the percent solids of the slurry to 25%. After homogenization, the slurry was spray dried. The resulting catalyst, labelled "BB", was calcined for 2 hours at 648° C. The attrition indices of the spray dried and the calcined catalysts were 47 and 11, respectively.

A comparison of catalyst AA and catalyst BB from examples 22 and 23, respectively, illustrates an improvement in attrition resistance when combining the phosphoric acid with the zeolite slurry after, instead of before, zeolite ball-milling. The spray dried catalyst prepared in Example 23 has a substantially poorer attrition resistance (47 vs. 8) than the catalyst in Example 22. After calcination, however, the difference is substantially reduced ( 11 vs. 7 ).

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A process for converting feedstock hydrocarbon compounds to product hydrocarbon compounds having a lower molecular weight than the feedstock hydrocarbon compounds which comprises contacting said feedstock at conversion conditions with a catalyst composition comprising catalyst manufactured by the method comprising the steps of:
   forming a first slurry comprising clay and a source of phosphorus;
   mixing said first slurry with an acid stable zeolite component to form a second slurry; and
   spray drying said second slurry at a pH of below 3.

2. The process of claim 1 wherein said second slurry is spray dried at a pH of less than or equal to 2.

3. The process of claim 1 wherein the contact time between said clay and said source of phosphorus prior to said mixing step is less than 30 minutes.

4. The process of claim 1 wherein the contact time between said clay and said source of phosphorus prior to said mixing step is less than 15 minutes.

5. The process of claim 1 wherein the catalyst composition is calcined prior to said contacting.

6. The process of claim 1 wherein said acid stable zeolite has a $SiO_2/Al_2O_3$ molar ratio of at least about 23/1.

7. The process of claim 1 wherein said source of phosphorus is selected from the group consisting of phosphoric acid, ammonium dihydrogen phosphate, ammonium monohydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, and mixtures thereof.

8. The process of claim 1 wherein said source of phosphorus is phosphoric acid.

9. The process of claim 1 wherein said clay comprises Kaolin.

10. The process of claim 1 wherein said acid stable zeolite component comprises crystalline material having the structure of ZSM-5.

11. The process of claim 1 wherein said conversion conditions include temperature of from about 400° C. to about 650° C. and a pressure of from atmospheric to about 5 atmospheres.

12. The process of claim 1 wherein said conversion conditions include an average reactor temperature of from about 450° C. to about 540° C., a catalyst/oil volume ratio of from about 2 to about 7, and a space volume hourly velocity of from about 1 to about 5.

13. The process of claim 1 wherein said conversion conditions include a riser top temperature of from about 500° C. to about 595° C., a catalyst/oil weight ratio of from about 3 to about 12, and a catalyst residence time of from about 0.5 to about 15 seconds.

14. The process of claim 1 wherein said acid-stable zeolite component comprises a large-pore molecular sieve material having pore openings of greater than about 7 Angstroms.

15. The process of claim 14 wherein the large-pore molecular sieve material is selected from the group consisting of zeolites REY, USY, REUSY, dealuminated Y, ultrahydrophobic Y, silicon-enriched dealuminated Y, ZSM-20, Beta, L, silicoaluminophosphates SAPO-5, SAPO-37, SAPO-40, MCM-9, metalloaluminophosphate MAPO-36, aluminophosphate VPI-5, and mesoporous crystalline MCM-41.

16. The process of claim 15 wherein the large-pore molecular sieve material comprises REY, USY, or REUSY.

17. The process of claim 1 wherein said feedstock comprises a gas oil having an initial boiling point above about 204° C. and an end point of at least about 315° C.

18. The process of claim 1 wherein said feedstock comprises deep cut gas oil, vacuum gas oil, thermal oil, residual oil, cycle stock, whole top crude, tar sand oil, shale oil, or a 19. The process of claim 18 wherein said feedstock comprises residual oil or deep cut gas oil.

20. The process of claim 1 wherein said catalyst composition further comprises from about 0.01 ppm to about 100 ppm by weight of an oxidation promoter selected from the group consisting of platinum, palladium, iridium, osmium, rhodium, ruthenium, rhenium, and combination thereof.

21. A process for cracking feedstock hydrocarbon compounds to product comprising gasoline and olefins of 3 to 4 carbon atoms which comprises contacting said feedstock at cracking conditions including a temperature of from about 400° C. to about 650° C. with a catalyst composition comprising catalyst manufactured by the method comprising the steps of:

forming a first slurry comprising clay and a source of phosphorus;

mixing said first slurry with an acid stable zeolite component to form a second slurry; and spray drying said second slurry at a pH of below 3.

22. The process of claim 21 wherein said zeolite component comprises crystalline material having the structure of ZSM-5.

23. The process of claim 21 wherein said zeolite component comprises a large-pore molecular sieve material having pore openings of greater than about 7 Angstroms.

24. The process of claim 23 wherein the large-pore molecular sieve material comprises REY, USY, or REUSY.

25. The process of claim 21 wherein said catalyst composition further comprises from about 0.01 ppm to about 100 ppm by weight of an oxidation promoter selected from the group consisting of platinum, palladium, iridium, osmium, rhodium, ruthenium, rhenium, and combination thereof.

26. A process for converting feedstock hydrocarbon compounds to product hydrocarbon compounds having a lower molecular weight than the feedstock hydrocarbon compounds which comprises contacting said feedstock at conversion conditions with a catalyst composition comprising catalyst manufactured by the method comprising the steps of:

forming a slurry comprising clay, a source of phosphorus, and an acid stable zeolite component; and spray drying said slurry at a pH of below 3.

27. A process for cracking feedstock hydrocarbon compounds to product comprising gasoline and olefins of 3 to 4 carbon atoms which comprises contacting said feedstock at cracking conditions including a temperature of from about 200° C. to about 870° C. with a catalyst composition comprising catalyst manufactured by the method comprising the steps of:

forming a slurry comprising clay, a source of phosphorus, and an acid stable zeolite component; and spray drying said slurry at a pH of below 3.

* * * * *

UNITED STATES PATENT AND TRADEMARK OFFICE
CERTIFICATE OF CORRECTION

PATENT NO. : 5,348,643
DATED : September 20, 1994
INVENTOR(S) : Robert P. L. Absil et al It is certified that error appears in the above-indentified patent and that said Letters Patent is hereby corrected as shown below:

Column 17, line 7, claim 18, after "a" insert —product of hydrotreatment thereof—.

Signed and Sealed this

Fifteenth Day of November, 1994

Attest:

BRUCE LEHMAN

Attesting Officer    Commissioner of Patents and Trademarks